(12) United States Patent
Ouyang et al.

(10) Patent No.: US 10,338,454 B2
(45) Date of Patent: Jul. 2, 2019

(54) OPTICAL CLOCK GENERATOR

(71) Applicant: Zhengbiao Ouyang, Shenzhen, Guangdong (CN)

(72) Inventors: Zhengbiao Ouyang, Guangdong (CN); Quanqiang Yu, Guangdong (CN)

(73) Assignee: Zhengbiao Ouyang, Shenzhen (CN)

( * ) Notice: Subject to any disclaimer, the term of this patent is extended or adjusted under 35 U.S.C. 154(b) by 0 days.

(21) Appl. No.: 15/626,209

(22) Filed: Jun. 19, 2017

(65) Prior Publication Data

US 2017/0285442 A1    Oct. 5, 2017

Related U.S. Application Data

(63) Continuation of application No. PCT/CN2015/097840, filed on Dec. 18, 2015.

(30) Foreign Application Priority Data

Dec. 19, 2014  (CN) .......................... 2014 1 0804840

(51) Int. Cl.
*G02F 3/00* (2006.01)
*G02F 1/35* (2006.01)
*G02B 6/122* (2006.01)

(52) U.S. Cl.
CPC ............. *G02F 3/00* (2013.01); *G02B 6/1225* (2013.01); *G02F 1/3501* (2013.01); *G02F 2201/06* (2013.01); *G02F 2202/32* (2013.01)

(58) Field of Classification Search
CPC .................. G02B 6/1225; G02B 6/125; G02B 2006/1213; G02F 1/3501; G02F 1/365;

(Continued)

(56) References Cited

U.S. PATENT DOCUMENTS 4,382,660 A * 5/1983 Pratt, Jr. .................. G02F 3/00
359/244
2006/0062507 A1  3/2006 Yanik et al.

FOREIGN PATENT DOCUMENTS

CN    101251701 A    8/2008
CN    101446843 A    6/2009

OTHER PUBLICATIONS

1st Office Action of counterpart Chinese Patent Application No. 201410804840.3 dated Dec. 30, 2016.

* cited by examiner

*Primary Examiner* — Stephone B Allen
*Assistant Examiner* — Adam W Booher
(74) *Attorney, Agent, or Firm* — Zhihua Han

(57) ABSTRACT

An optical clock generator includes a nonlinear cavity unit, a cross-waveguide logic gate unit and a delayer unit; and is of a six-port photonic crystal structure including two reference-light signal-input ports, a feedback-signal-input port, a system-signal and feedback-signal output port and two idle ports; the output port of the cross-waveguide logic gate unit is connected with the input port of the nonlinear cavity unit whose system-signal output port is connected with the input port of said delayer unit whose output port is connected with the input port of the cross-waveguide logic gate unit, the system-signal output port is connected with a two-branch waveguide one of which is used as the system-signal output port, and another is used as the feedback-signal output port and connected to an input port of said delayer unit, the delayer unit performs time delay on an input signal and outputs the signal to the feedback-signal-input port.

12 Claims, 4 Drawing Sheets

(58) Field of Classification Search
CPC ... G02F 3/00; G02F 3/02; G02F 3/024; G02F 3/028; G02F 2201/06; G02F 2202/32; B82Y 20/00; G06E 1/00; G06E 1/02; H03K 19/14

See application file for complete search history.

| Input /P$_0$ | Input /P$_0$ | Output /P$_0$ | Logic Output |
|---|---|---|---|
| Port 1 | Port 2 | Port 7 | Port 7 |
| 1 | 0 | 0.64 | 1 |
| 1 | 1 | 0.048 | 0 |

FIG. 5

| A | B | C | Y |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 0 |
| 1 | 1 | 0 | 1 |
| 1 | 1 | 1 | 1 |

OPTICAL CLOCK GENERATOR

CROSS-REFERENCE TO RELATED APPLICATION

This application is a continuation application of PCT Application No. PCT/CN2015/097840 filed on Dec. 18, 2015, which claims priority to Chinese Patent Application No. 201410804840.3 filed on Dec. 19, 2014, the entire contents of which are hereby incorporated by reference.

FIELD OF THE INVENTION

The present invention relates generally to two-dimensional (2D) photonic crystals (PhCs), nonlinear optics and optical clock generator.

BACKGROUND OF THE INVENTION

In 1987, the concept of PhC was proposed separately by E. Yablonovitch from United States Bell Labs who discussed how to suppress spontaneous radiation and by John from Princeton University who made discussions about photonic localization. PhC is a material structure in which dielectric materials are arranged periodically in space, and is usually an artificial crystal consisting of two or more materials having different dielectric constants.

With the emergence of and in-depth research on PhC, people can control the motion of photons in a PhC material more flexibly and effectively. In combination with traditional semiconductor processes and integrated circuit technologies, design and manufacture of PhC and devices thereof have continually and rapidly marched towards all-optical processing, and PhC has become a breakthrough for photonic integration. In December 1999, PhC was recognized by the American influential magazine *Science* as one of the top ten scientific advances in 1999, and therefore has become a hot topic in today's scientific research field.

An all-optical logic device mainly includes an optical amplifier-based logic device a non-linear loop mirror logic device, a Sagnac interference type logic device, a ring cavity logic device, a multi-mode interference logic device, an optical waveguide coupled logic device, a photoisomerized log device, a polarization switch optical logic device, a transmission grating optical logic device, etc. These optical logic devices have the common shortcoming of large size in developing large-scale optical circuit. With the improvement of science and technology in recent years, have also researched and developed quantum optical logic devices, nano material optical logic devices and PhC optical logic devices, which all conform to the dimensional requirement of large-scale photonic integrated optical circuit. For modern manufacturing processes, however, the quantum optical logic devices and the nanomaterial optical logic devices are very difficult to be manufactured, whereas the PhC optical logic devices have competitive advantages in terms of manufacturing process.

In recent years, PhC logic devices have become a hot area of research drawing widespread attentions, and it is highly likely for them to replace the current widely-applied electronic logic devices in the near future. The PhC logic device can directly realize all-optical logical functions, such as "AND", "OR", "NOT" and the and is a core device for realizing all-optical computing.

SUMMARY OF THE INVENTION

The present invention overcomes the defects of the prior art, and provides an optical clock generator compact in structure, strong in anti-interference capability and easy to integrate with other optical logic elements.

The technical proposal adopted by the invention to solve the technical problem is as follows:

An optical clock generator of the present invention includes a nonlinear cavity unit, a cross-waveguide logic gate unit and a delayer unit; the optical clock generator is of a six-port optical crystal structure, and includes of two reference-light-signal input ports, a feedback-signal input port, a system-signal and feedback-signal output port and two idle ports; the output port of the cross-waveguide logic gate unit is connected with the input port of the nonlinear cavity unit, and the system-signal output port of the nonlinear cavity unit is connected with the input port of the delayer unit; and the output port of the delayer unit is connected with the input port of the cross-waveguide logic gate unit, the system-signal output port is connected with a two-branch waveguide, one port of the two-branch waveguide is used as the system-signal output port, and another port is used as the feedback-signal output port and connected to an input port of the delayer unit, the delayer unit performs time delay on an input signal and outputs the signal to the feedback-signal input port.

The signal input port of the nonlinear cavity unit is connected with the output port of the cross-waveguide logic gate unit.

The nonlinear cavity unit is a 2D PhC cross-waveguide nonlinear cavity and is a 2D PhC cross-waveguide four-port network formed by high-refractive-index dielectric pillars, the four-port network has a four-port PhC structure, a left port of the four-port network is the reference-light input port, a lower port is an intermediate signal input port, an upper port is the system-signal output port, and a right port is the idle port; two mutually-orthogonal quasi-one-dimensional (1D) PhC structures are placed in two waveguide directions crossed at a center of across waveguide; a dielectric cylinder is arranged in the middle the cross waveguide, the dielectric cylinder is made of a nonlinear material, and the cross section of the dielectric cylinder is square, polygonal, circular or oval; the dielectric constant of a rectangular linear pillar clinging to a central nonlinear pillar and close to the signal output port is equal to that of the central dielectric cylinder under low-light-power conditions; the quasi-1DPhC structures and the dielectric cylinder constitute a waveguide defect cavity.

The cross-waveguide logic gate unit is the cross-waveguide PhC optical "OR", "NOT" and "XOR" logic gate.

The cross-waveguide logic gate unit is a PhC structure of the four-port waveguide network, the right port of the four-port network is the reference-light input port, the lower port is the signal input port, the upper port is the intermediate signal output port, and the left port is the idle port; a circular dielectric pillar is arranged in the center of the cross waveguide of the four-port network, "NOT" logic of all-optical signals can be performed by setting different input ports.

The cross section of the dielectric pillar in the quasi-1D PhC of the cross waveguide is rectangular, circular or polygonal, and the refractive index of the dielectric pillar is 3.4 or a different value more than 2.

The high-refractive-index linear-dielectric pillar of the 2D PhC and has a cross section of circular, polygonal, triangle or oval.

The background filling material for forming the 2D PhC is air or a different low-refractive-index dielectric having the refractive index lower than 1.4.

The optical clock generator, according to claim 9 wherein the 2D PhC is a (2m+1)×(2n+1) array structure, where in is an integer more than or equal to 5, and where n is an integer more than or equal to 8.

The clock signal generator of the present invention can be widely applied to optical communication bands. Compared with the prior art, it has the following advantages.

1. All-optical clock signals of different clock cycles are obtained by adjusting the delay time of the delayer unit, so that an all-optical clock signal generator is realized.

2. The clock signal generator has the advantages of compact in structure, high contrast of high and low logic output, fast in operation, strong anti-interference capability and the like, and ease of integration with other optical logic elements; and 3. The working bands of the optical clock generator can be adjusted to optical communication bands by scaling the structure of the present invention.

These and other objects and advantages of the present invention will become readily apparent to those skilled in the art upon reading the following detailed description and claims and by referring to the accompanying drawings.

BRIEF DESCRIPTION OF THE DRAWINGS

In FIG. 1, indications are: nonlinear cavity unit 01, cross-waveguide logic gate unit 02, delayer unit 03, reference-light input port 1, feedback-signal input port 2, idle light output port 3, reference-light input port 4, system-signal output port 5, idle light output port 6, feedback-signal output port, first oblong high-refractive-index linear-dielectric pillar 11, second oblong high-refractive-index linear-dielectric pillar 12, square nonlinear-dielectric cylinder 13, circular high-refractive-index linear-dielectric pillar 14, circular linear-dielectric pillar 15.

In FIG. 2 (a), indications are: reference-light input port 1, signal input port 2, idle port 3, and an intermediate signal output port 7.

FIG. 2 (b) is a structural diagram of a nonlinear cavity unit of the present invention.

In FIG. 2 (b), indications are: reference-light input port 4, signal output port 5, idle port 6, and an intermediate signal input port 8.

FIG. 5 is an input and output relation table of the "NOT" logic gate of the cross-waveguide logic gate unit shown in FIG. 2(a).

FIG. 6 is a truth table of logic functions of the nonlinear cavity unit shown in FIG. 2(b).

The present invention is more specifically described in the following paragraphs by reference to the drawings attached only by way of example.

DETAILED DESCRIPTION OF THE EMBODIMENTS

The terms a or an, as used herein, are defined as one or more than one. The term plurality, as used herein, is defined as two or more than two. The term another, as used herein, is defined as at least a second or more.

Figure 1:
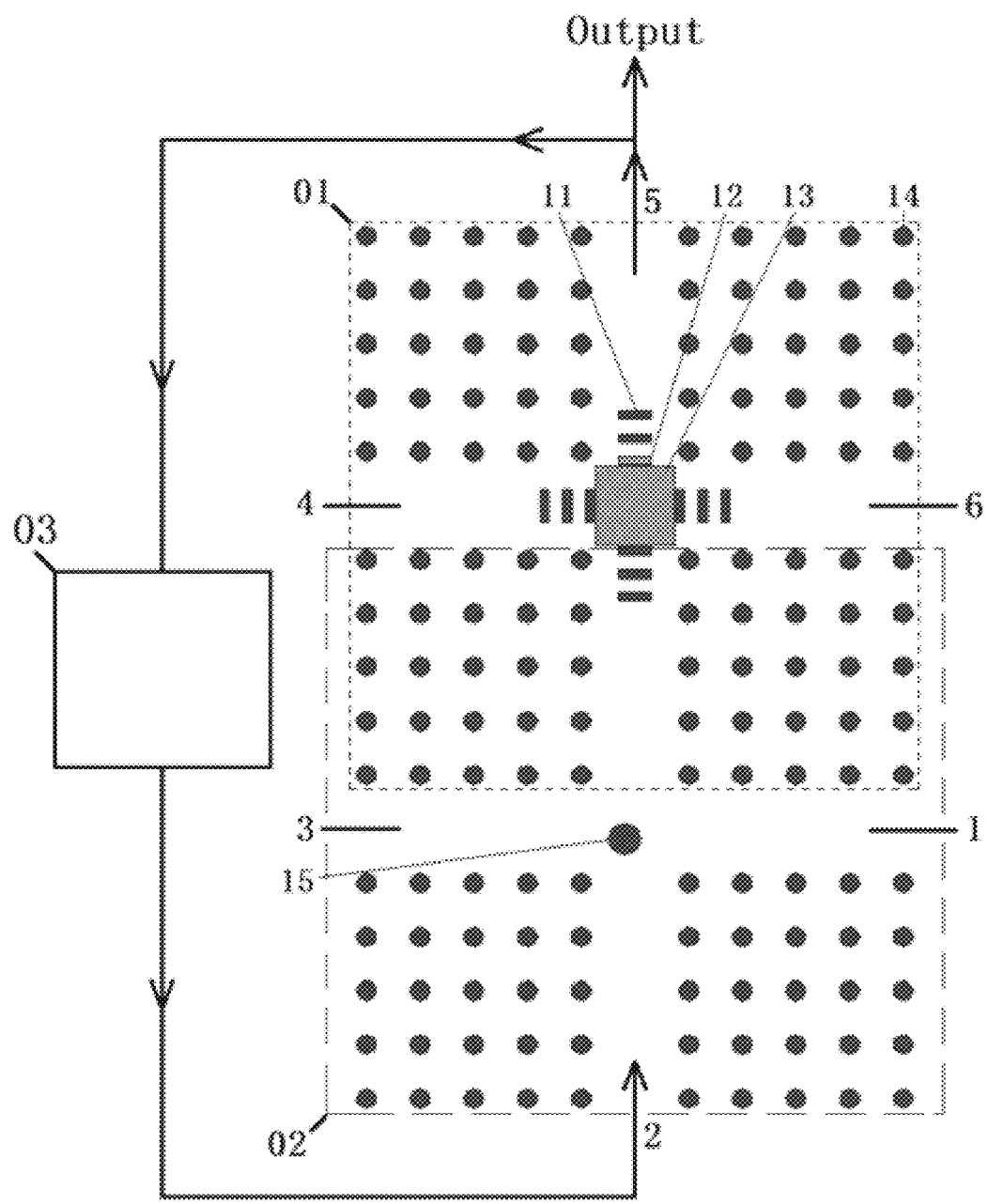
FIG. 1 is a structural diagram of an optical clock generator of the present invention.

Referring to FIG. 1, the optical clock generator of the present invention comprises a nonlinear cavity unit 01, a cross-waveguide logic gate unit 02 and a delayer unit 03; the optical clock generator is of a six-port optical crystal structure, and is included of two reference-light-signal input ports, a feedback-signal input port, a system-signal and feedback-signal output port and two idle ports; the output port of the cross-waveguide logic gate unit 02 is connected with the input port of the nonlinear cavity unit 01, and the system-signal output port of the nonlinear cavity unit 01 is connected with the input port of the delayer unit; and the output port of the delayer unit is connected with the input port of the cross-waveguide logic gate unit 02.

As shown in FIG. 1, the nonlinear cavity unit 01 is a 2DPhC cross-waveguide nonlinear cavity and is a 2D PhC cross-waveguide four-port network formed by high-refractive-index dielectric pillars, the four-port network has a four-port PhC structure, the left port the four-port network is a reference-light input port, the lower port is an intermediate signal input port, the upper port is a signal output port, and the right port is an idle port; two mutually-orthogonal quasi-1DPhC structures are placed in two waveguide directions crossed at the center of across waveguide; an dielectric cylinder is arranged in the middle of the cross waveguide, the dielectric cylinder is nonlinear-dielectric cylinder, and is made of a nonlinear material, and the cross section of the dielectric cylinder is square, polygonal circular or oval; the dielectric constant of a rectangular linear pillar clinging to a central nonlinear pillar and close to the signal output port is equal to that of the central nonlinear pillar under low-light-power conditions; the quasi-1DPhC structures and the dielectric cylinder constitute a waveguide defect cavity.

Twelve oblong high linear-dielectric pillars and one square nonlinear-dielectric cylinder are arranged in the center of the 2DPhC cross-waveguide nonlinear cavity in the form of a quasi-1DPhC along longitudinal and transverse waveguide directions, the square nonlinear-dielectric pillar 13 clings to the four adjacent oblong linear-dielectric pillars and the distance there between is 0, every two adjacent oblong linear-dielectric pillars are spaced 0.2668d from each other, the first oblong high-refractive-index linear-dielectric pillar 11 has a refractive index of 3.4, the second oblong high-refractive-index linear-dielectric pillar 12 is a dielectric constant of 7.9, and has a dielectric constant consistent with that of a nonlinear-dielectric pillar under low-light-power conditions, and has a dimension equal to that of the first oblong high-refractive-index linear-dielectric pillar 11; and the central square nonlinear-dielectric cylinder 13 is made of a Kerr type nonlinear material, and has a dielectric constant of 7.9 under low-light-power conditions; the circular high-refractive-index linear-dielectric pillar 14 is made of a silicon (Si) material, and has a refractive index of 3.4.

Figure 2:
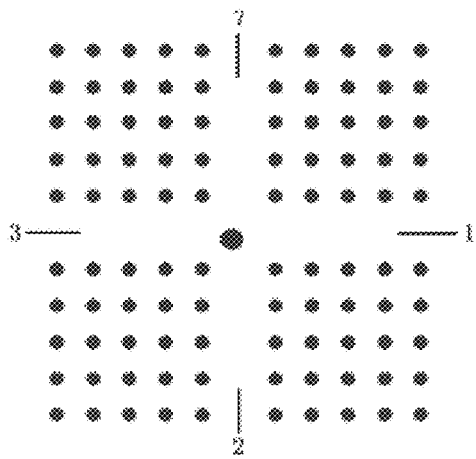
FIG. 2 (a) is a structural diagram of the cross-waveguide logic gate unit of the present invention.
Figure 2:
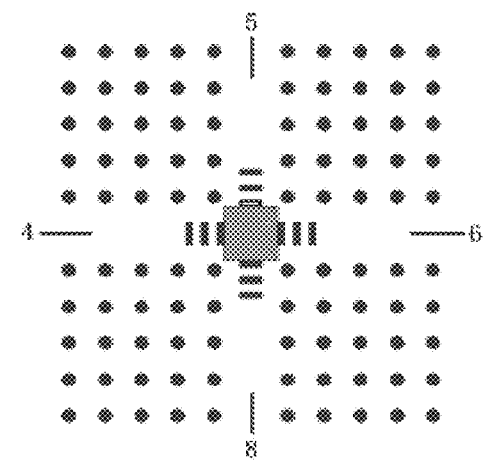

The optical clock generator can be realized under the coordination of the delayer unit 03 and the logic operation characteristics of the cross-waveguide logic gate unit shown in FIG. 2 (a).

Firstly introduced is the basic principle of the PhC nonlinear cavity unit of the present invention: a 2DPhC provides a Photonic Band Gap (PBG) with certain bandwidth, a light wave with its wavelength falling into this bandgap can be propagated in an optical circuit designed inside the PhC, and the operating wavelength of the device is thus set to certain wavelength in the PBG shown in FIG. 2(b). the quasi-1DPhC structure arranged in the center of the cross wave guide and the nonlinear effect of the central nonlinear-dielectric cylinder together provide a defect state mode, which, as the input light wave reaches a certain light intensity, shifts to the operating frequency of the system, so that the structure produces the tunneling effect and signals are output from the output port 5.

The cross-waveguide logic gate unit 02, as shown in FIG. 2(*a*), is a cross-waveguide PhC optical "OR", "NOT" and "XOR" logic gate, can perform logic operation on input signals, and can realize "NOT", "XOR" and "OR" logic functions respectively by setting different input or output ports; the cross-waveguide logic gate unit is a PhC of a four-port waveguide network, the right port of the four-port network is the reference-light input port, the lower port is the signal input port, the upper port is the intermediate signal output port, and the left port is the idle port; a circular dielectric cylinder is arranged in the center of the cross waveguide of the four-port network, "NOT" logic of all-optical signals can be performed by setting different input ports. as shown in FIG. 2(*a*), The lattice constant of the 2DPhC array is d, and the array number is 11×11; a circular dielectric cylinder is arranged nearby the center of the cross waveguide of the four-port network, it is supposed that the center of symmetry of the cross waveguide is an origin (0, 0), the circle center of the circular dielectric cylinder in the center is at the position (−0.188d, −0.188d), and the radius is 0.292d. As shown in FIG. 2(*a*), the reference-light input port 1, the signal input port 2, the idle port and the signal output port 7, the port 1 is a reference-light input port to which reference-light E (E=$P_0$) is input, port 2 is a signal light input port, port 7 is a signal output port, port 3 is an idle port, and thus the unit realizes a "NOT" logic operation function of input signals, as shown in FIG. 5.

Hence, as shown in FIG. 2(*a*) can realize a "NOT" logic operation function of the cross-waveguide logic gate unit.

The nonlinear cavity unit, as shown in FIG. 2(*b*), is a 2DPhC cross-waveguide nonlinear cavity, and realizes set logic functions by using the superior logic output as a logic input according to the logic operation characteristics itself. The 2DPhC cross-waveguide nonlinear cavity is a 2D PhC cross-waveguide four-port network formed by high-refractive-index dielectric pillars, the left port of the four-port network is the reference-light input port, the lower port is the intermediate signal input port, the upper port is the system-signal output port, and the right port is the idle port; two mutually-orthogonal quasi-1D PhC structures are placed in two waveguide directions crossed at the center of across waveguide, a dielectric cylinder is arranged in the middle of the cross waveguide, the dielectric cylinder is nonlinear-dielectric cylinder, and is made of a nonlinear material, the cross section of the dielectric cylinder is square, polygonal, circular or oval, and the dielectric constant of a rectangular linear pillar clinging to the central nonlinear pillar and close to the signal output port is equal to that of the central nonlinear pillar under low-light-power conditions, and the quasi-1DPhC structures and the dielectric cylinder constitute a waveguide defect cavity. The lattice constant of the 2DPhC array is d, and the array number is 11×11.

Figure 3:
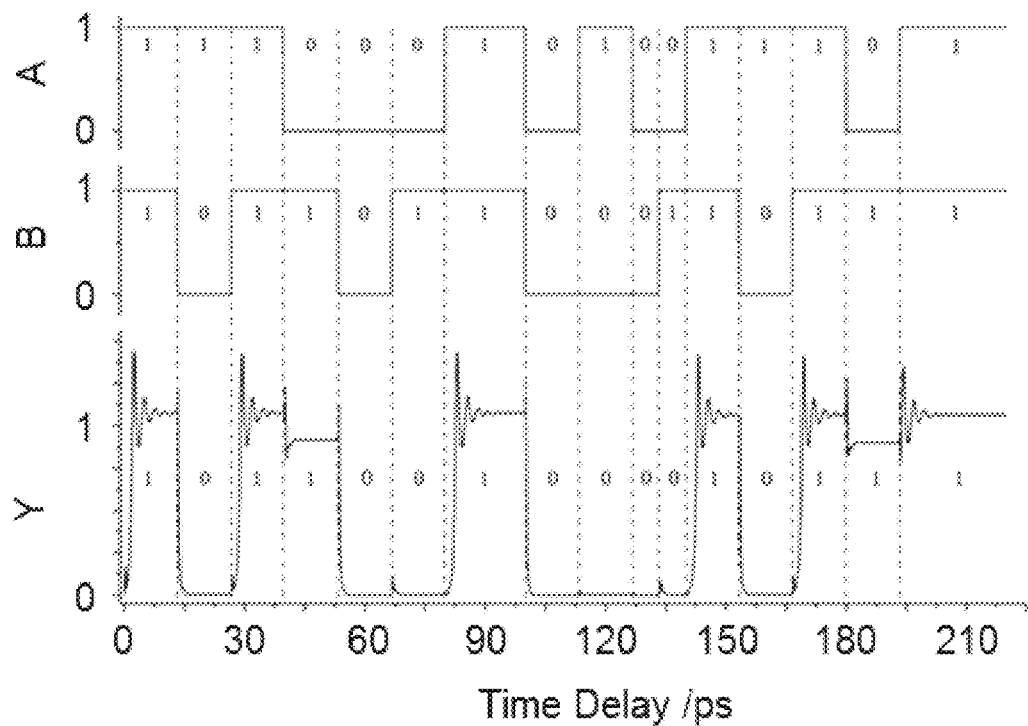
FIG. 3 is a waveform diagram of basic logic functions of the nonlinear cavity unit shown in FIG. 2 (b).

For the lattice constant d of 1 μm and the operating wavelength of 2.976 μm, referring to the 2DPhC cross-waveguide nonlinear cavity shown of FIG. 2(*b*), for a signal A input from the port 4 as a reference light and a signal B input from the port 8 as an intermediate signal shown by the upper two diagrams in FIG. 3, the logic output waveform diagram of output at the signal-output port 5 in the 2DPhC nonlinear cavity unit 01 of the present invention can be obtained, as indicated in the lower part of FIG. 3. A logic operation truth table of the structure shown in FIG. 2 (*b*) can be obtained according to the logic operation characteristic shown in FIG. 3, as illustrated in FIG. 6. In FIG. 6, C is current state $Q^n$, and Y is signal output at the output port 5 of the nonlinear cavity unit, i.e., next state $Q^{n+1}$. A logic expression of the nonlinear cavity unit can be obtained according to the truth table.

$$Y=AB+BC \quad (1)$$

That is $$Q^{n+1}=AB+BQ^n \quad (2)$$

As the cross-waveguide logic gate unit having a "NOT" logic gate structure as shown in FIG. 2(*a*) is coupled with the nonlinear cavity unit shown in FIG. 2(*b*), the output port 7 of the cross-waveguide "NOT" logic gate shown in FIG. 2(*a*) is connected with the intermediate signal input port 8 of the nonlinear cavity unit shown in FIG. 2(*b*), i.e., the output signal of the "NOT" logic gate is used as the input signal of the input port 8 of the nonlinear cavity unit, as shown in FIG. 1. In FIG. 1, the reference-light input port 1, the reference-light input port 4 and the feedback-signal input port, when reference-light $E_1$ and $E_2$ ($E_1=E_2=1$) are respectively input to the port 1 and the port 4, a signal $S_1$ is input to the port 2, and according to the logic operation characteristic of the "NOT" logic gate of the cross-waveguide logic gate unit 02 and the logic expression (2) of the nonlinear cavity unit 01, the output of the output port 5 of the structure shown in FIG. 1 can be obtained:

$$Q^{n+1}=\overline{S_1} \quad (3)$$

wherein $\overline{S_1}$ is a high-contrast "NOT" logic signal. Hence, in the structure shown in FIG. 1, the combination of the nonlinear cavity unit 01 and the cross-waveguide logic gate unit 02 can realize a "NOT" logic operation function on input signals.

At the moment, the output port 5 is connected with a two-branch waveguide, one port of the two-branch waveguide is used as a system output port, the other port is used as a feedback-signal output port and connected to the input port of the delayer unit 03, and the delayer unit 03 performs time delay on an input signal and outputs the signal to the feedback-signal input port 2, i.e., the delayer unit 03 performs certain delay on the feedback signal and then outputs the feedback signal to the feedback-signal input port 2. As shown in FIG. 1, the delayer unit 03 takes the output signal of the system output port as an input signal, the total delay time as the feedback signal is transmitted from the output port 5 to the feedback-signal input port 2 is $T_0$ by setting the delay time of the delayer unit 03, and the system output port 5 will generate a clock signal having the cycle $2T_0$ and output it.

Hence, the structure of the present invention can realize an all-optical clock signal generator.

The PhC structure of the device of the present invention is a (2m+1)×(2n+1) array structure, where m is an integer more than or equal to 5, and n is an integer more than or equal to 8. Two embodiments will be given below in combination with the accompanying drawings, and an 11×17 array structure is preferably adopted in the embodiments, and design and simulation results are given, taking the lattice constant d of the 2D PhC array being 1 μm and 0.5208 μm respectively as an example.

Embodiment 1

Figure 4:
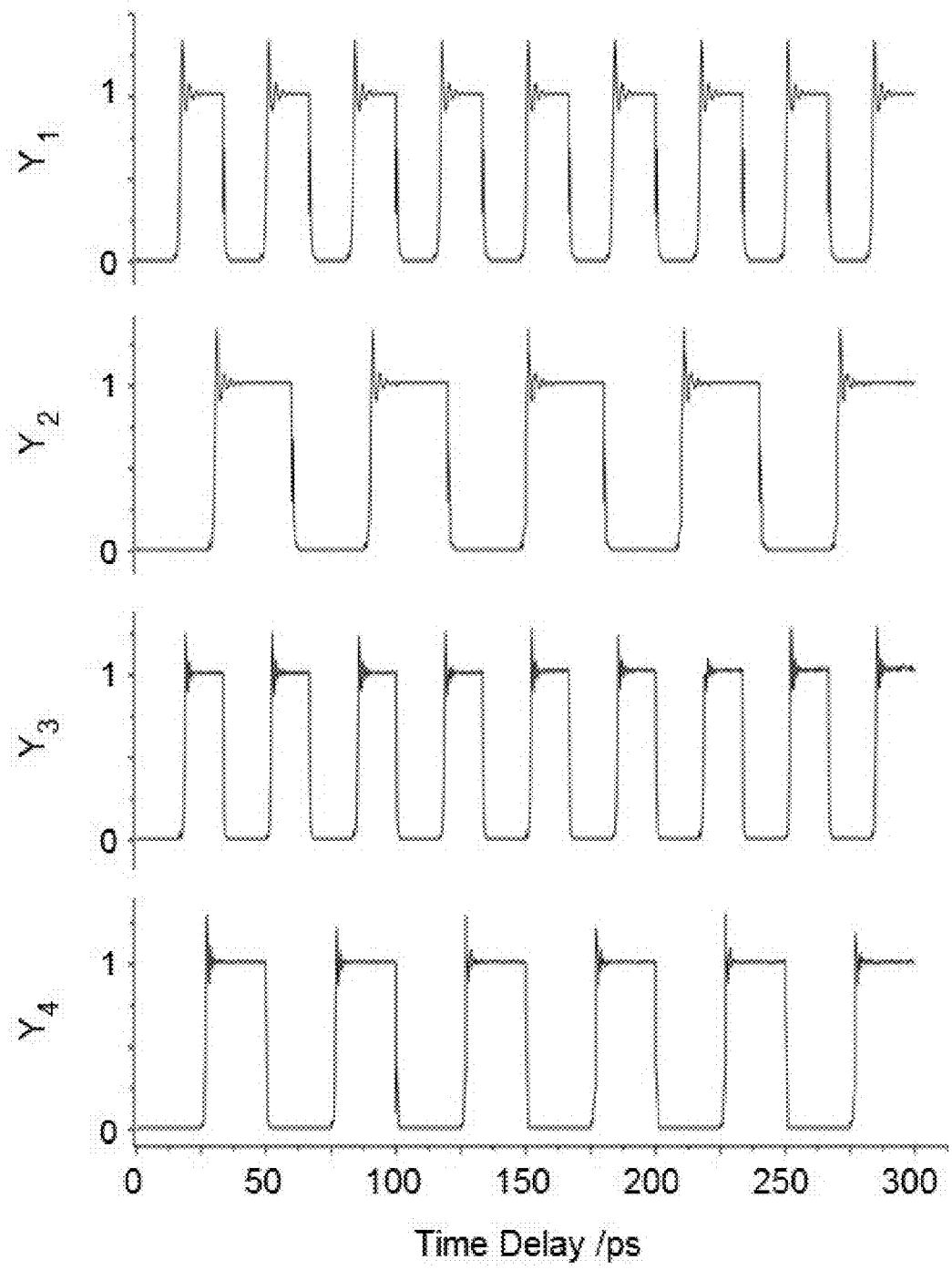
FIG. 4 is a waveform diagram of optical clock signals of the optical clock generator of the present invention in different cycles.

Referring to that shown in FIG. 1, the lattice constant d is 1 μm; the operating wavelength is 2.976 μm; the radius of the circular high-refractive-index linear-dielectric pillar 14 is 0.18 μm; the long sides of the first oblong high-refractive-index linear-dielectric pillar 11 are 0.613 μm, and the short sides are 0.162 μm; the size of the second oblong high-refractive-index linear-dielectric pillar 12 is consistent with that of the first oblong high-refractive-index linear-dielectric pillar 11; the side length of square nonlinear-dielectric cylinder 13 is 1.5 μm, and the third-order nonlinear coefficient is $1.33 \times 10^{-2}$ μm$^2$/V$^2$; and the distance between every two adjacent oblong linear-dielectric pillars is 0.2668 μm; the radius of the circular linear-dielectric pillar 15 is 0.292 μm;

Referring to the structure shown in FIG. 1, reference-light $E_1$ and $E_2$ are respectively input to the port 1 and the port 4, wherein $E_1=E_2=1$; the total delay time $T_0$ as the output signal of the signal output port 5 is transmitted to the feedback-signal input port 2 via a feedback loop is 16.65 ps, as shown by $Y=Y_1$ in FIG. 4, the output of the system-signal output port 5 has the waveform of an optical clock signal having the clock cycle $T=2T_0=33.3$ ps.

Embodiment 2

In the same way, referring to that shown in FIG. 1, the lattice constant d is 1 μm; the operating wavelength is 2.976 μm; the radius of the circular high-refractive-index linear-dielectric pillar 14 is 0.18 μm; the long sides of the first oblong high-refractive-index linear-dielectric pillar 11 are 0.613 μm, and the short sides are 0.162 μm; the size of the second oblong high-refractive-index linear-dielectric pillar 12 is consistent with that of the first oblong high-refractive-index linear-dielectric pillar 11; the side length of square nonlinear-dielectric cylinder 13 is 1.5 μm, and the third-order nonlinear coefficient is $1.33 \times 10^{-2}$ μm$^2$/V$^2$; and the distance between every two adjacent oblong linear-dielectric pillars is 0.2668 μm; the radius of the circular linear-dielectric pillar 15 is 0.292 μm.

Referring to the structure shown in FIG. 1, reference-light $E_1$ and $E_2$ are respectively input to the port 1 and the port 4, wherein $E_1=E_2=1$; the total delay time $T_0$ as the output signal of the signal output port 5 is transmitted to the feedback-signal input port 2 via a feedback loop is 30 ps, as shown by $Y=Y_2$ in FIG. 4, the output of the system-signal output port 5 has the waveform of an optical clock signal having the clock cycle $T=2T_0=60$ ps.

Embodiment 3

Referring to that shown in FIG. 1, the lattice constant d is 0.5208 μm; the operating wavelength is 1.55 μm; the radius of the circular high-refractive-index linear-dielectric pillar 14 is 0.0937 μm; the long sides of the first oblong high-refractive-index linear-dielectric pillar 11 are 0.3193 μm, and the short sides are 0.0844 μm; the size of the second oblong high-refractive-index linear-dielectric pillar 12 is consistent with that of the first oblong high-refractive-index linear-dielectric pillar 11; the side length of square nonlinear-dielectric cylinder 13 is 0.7812 μm, and the third-order nonlinear coefficient is $1.33 \times 10^{-2}$ μm$^2$/V$^2$; and the distance between every two adjacent oblong linear-dielectric pillars is 0.1389 μm; the radius of the circular linear-dielectric pillar 15 is 0.0937 μm.

Referring to the structure shown in FIG. 1, reference-light $E_1$ and $E_2$ are respectively input to the port 1 and the port 4, wherein $E_1=E_2=1$; the total delay time $T_0$ as the output signal of the signal output port 5 is transmitted to the feedback-signal input port 2 via a feedback loop is 16.65 ps, as shown by $Y=Y_3$ in FIG. 4, the output of the system-signal output port 5 has the waveform of an optical clock signal having the clock cycle $T=2T_0=33.3$ ps.

Embodiment 4

Referring to that shown in FIG. 1, the lattice constant d is 0.5208 μm; the operating wavelength is 1.55 μm; the radius of the circular high-refractive-index linear-dielectric pillar 14 is 0.0937 μm; the long sides of the first oblong high-refractive-index linear-dielectric pillar 11 are 0.3193 μm, and the short sides are 0.0844 μm; the size of the second oblong high-refractive-index linear-dielectric pillar 12 is consistent with that of the first oblong high-refractive-index linear-dielectric pillar 11; the side length of square nonlinear-dielectric cylinder 13 is 0.7812 μm, and the third-order nonlinear coefficient is $1.33 \times 10^{-2}$ μm$^2$/V$^2$; and the distance between every two adjacent oblong linear-dielectric pillars is 0.1389 μm; the radius of the circular linear-die pillar 15 is 0.0937 μm.

Referring to that the structure shown in FIG. 1, reference-light $E_1$ and $E_2$ are respectively input to the port 1 and the port 4, wherein $E_1=E_2=1$; the total delay time $T_0$ as the output signal of the signal output port 5 is transmitted to the feedback-signal input port 2 via a feedback loop is 25 ps, as shown by $Y=Y_4$ in FIG. 4, the output of the system-signal output port 5 has the waveform of an optical clock signal having the clock cycle $T=2T_0=50$ ps.

While the invention has been described in terms of various specific embodiments, those skilled in the art will recognize that the invention can be practiced with modification within the spirit and scope of the claims.

What is claimed is:

1. An optical clock generator, comprising:
a nonlinear cavity unit, a cross-waveguide logic gate unit and a delayer unit; said optical clock generator is of a six-port optical crystal structure, and comprises of two reference-light-signal input ports, a feedback-signal input port, a system-signal and a feedback-signal output port and two idle ports; an output port of said cross-waveguide logic gate unit is connected with an input port of said nonlinear cavity unit, and a system-signal output port of said nonlinear cavity unit is connected with an input port of said delayer unit; and an output port of said delayer unit is connected with an input port of the cross-waveguide logic gate unit, a system-signal output port is connected with a two-branch waveguide, one port of the two-branch waveguide is used as said system-signal output port, and another port is used as said feedback-signal output port and connected to an input port of said delayer unit, said delayer unit performs time delay on an input signal and outputs the signal to the feedback-signal input port.

2. The optical clock generator according to claim 1, wherein a signal input port of the nonlinear cavity unit is connected with the output port of the cross-waveguide logic gate unit.

3. The optical clock generator according to claim 1, wherein said nonlinear cavity unit is a two-dimensional (2D) photonic crystal (PhC) cross-waveguide nonlinear cavity and is a 2D-PhC cross-waveguide four-port network formed by high-refractive-index dielectric pillars, the four-port network has a four-port PhC structure, a left port of the four-port network is a reference-light input port, a lower port is an intermediate signal input port, an upper port is the system-signal output port, and a right port is an idle port; two mutually-orthogonal quasi one-dimensional (1D) PhC structures are placed in two waveguide directions crossed at a center of a cross-waveguide a dielectric cylinder is arranged in the middle of the cross-waveguide, said dielectric cylinder is made of a nonlinear material, and a cross section of said dielectric cylinder is square, polygonal, circular or oval; a dielectric constant of a rectangular linear pillar clinging to a central nonlinear pillar and close to the signal output end is equal to that of the central dielectric cylinder under low-light-power conditions; said quasi-1D PhC structures and said dielectric cylinder constitute a waveguide defect cavity.

4. The optical clock generator according to claim 3, wherein a high-refractive-index linear-dielectric pillar of the 2D-PhC and has a cross section of circular, polygonal, triangle or oval.

5. The optical clock generator according to claim 3, wherein said 2D-PhC is a $(2m+1) \times (2n+1)$ array structure, where m is an integer more than or equal to 5, and n is an integer more than or equal to 8.

6. The optical clock generator according to claim 3, wherein a cross section of the dielectric pillar the quasi-1D PhC of the cross-waveguide is rectangular, circular or polygonal.

7. The optical clock generator according to claim 3, wherein the dielectric pillar in the quasi-1D PhC of the cross-waveguide is a refractive index of a different value more than 2.

8. The optical clock generator according to claim 3, wherein the dielectric pillar in the quasi-1D PhC of the cross-waveguide is a refractive index of the dielectric pillar is 3.4.

9. The optical clock generator according to claim 3, wherein a background filling material for forming the 2D-PhC is a different low-refractive-index medium having a refractive index lower than 1.4.

10. The optical clock generator according to claim 3, wherein a background filling material for forming the 2D-PhC is air.

11. The optical clock generator according to claim 1, wherein said cross-waveguide logic gate unit is a cross-waveguide PhC optical "OR", "NOT" and "XOR" logic gate.

12. The optical clock generator according to claim 1, wherein said cross-waveguide logic gate unit is a PhC structure of a four-port waveguide network, a right port of the four-port network is a reference-light input port, a lower port is a signal input port, an upper port is an intermediate signal output port, and a left port is an idle port; a circular dielectric pillar is arranged a center of said cross-waveguide of said four-port network, "NON" logic of all-optical signals can be performed by setting different input ports.

* * * * *